United States Patent
Itzkovitz et al.

(10) Patent No.: US 8,848,602 B2
(45) Date of Patent: Sep. 30, 2014

(54) PROVIDING SESSION-BASED SERVICES TO EVENT-BASED NETWORKS IN MULTI-LEG CALLS

(75) Inventors: Ayal Itzkovitz, Haifa (IL); Tal Zoller, Haifa (IL); Tzach Livyatan, Tel Aviv (IL); Nadav Kadosh, Givatayim (IL)

(73) Assignee: Oracle Israel Ltd. IL (US)

( * ) Notice: Subject to any disclaimer, the term of this patent is extended or adjusted under 35 U.S.C. 154(b) by 500 days.

(21) Appl. No.: 12/788,331

(22) Filed: May 27, 2010

(65) Prior Publication Data

US 2010/0303066 A1    Dec. 2, 2010

Related U.S. Application Data

(60) Provisional application No. 61/181,302, filed on May 27, 2009.

(51) Int. Cl.
| | |
|---|---|
| H04W 4/00 | (2009.01) |
| H04L 12/66 | (2006.01) |
| H04J 3/16 | (2006.01) |
| H04M 7/00 | (2006.01) |
| H04M 7/12 | (2006.01) |
| H04Q 3/00 | (2006.01) |
| H04L 29/06 | (2006.01) |

(52) U.S. Cl.
CPC ...... *H04M 7/0057* (2013.01); *H04M 2207/203* (2013.01); *H04L 65/1069* (2013.01); *H04M 2207/12* (2013.01); *H04M 7/127* (2013.01); *H04Q 3/0045* (2013.01); *H04L 65/1096* (2013.01); *H04L 65/1006* (2013.01)
USPC ............................ 370/328; 370/356; 370/466

(58) Field of Classification Search
None
See application file for complete search history.

(56) References Cited

U.S. PATENT DOCUMENTS

| | | |
|---|---|---|
| 5,566,235 A | 10/1996 | Hetz |
| 6,115,746 A | 9/2000 | Waters et al. |
| 6,226,373 B1 | 5/2001 | Zhu et al. |
| 6,333,931 B1 | 12/2001 | LaPier et al. |
| 6,366,658 B1 | 4/2002 | Bjornberg et al. |
| 6,418,205 B2 | 7/2002 | Capers et al. |
| 6,661,785 B1 | 12/2003 | Zhang et al. |

(Continued)

FOREIGN PATENT DOCUMENTS

| | | |
|---|---|---|
| WO | 9921345 A1 | 4/1999 |
| WO | 0042760 A1 | 7/2000 |
| WO | 2006077587 A2 | 7/2006 |

OTHER PUBLICATIONS

International Application PCT/IB2010/052356 Search report dated Nov. 29, 2010.

(Continued)

*Primary Examiner* — Melanie Jagannathan
(74) *Attorney, Agent, or Firm* — Meyer IP Law Group (57) ABSTRACT

A method for communication includes, during a multi-leg call conducted in a circuit-switched network, which operates in accordance with a first communication protocol that manages calls among subscribers by exchanging discrete events among elements of the circuit-switched network, receiving from the circuit-switched network a sequence of the events related to the multi-leg call. Based on the sequence of the events, multiple emulated communication sessions are generated in a packet-switched network that operates in accordance with a second communication protocol. Using the multiple emulated sessions, a service platform in the packet-switched network is caused to provide a communication service to the multi-leg call conducted in the circuit-switched network.

11 Claims, 4 Drawing Sheets

(56) References Cited

U.S. PATENT DOCUMENTS

| | | |
|---|---|---|
| 6,693,898 B1 | 2/2004 | Su et al. |
| 6,735,621 B1 | 5/2004 | Yoakum et al. |
| 6,940,847 B1 | 9/2005 | Glitho et al. |
| 6,954,455 B1 | 10/2005 | Al Hakim et al. |
| 6,963,583 B1 | 11/2005 | Foti |
| 6,967,972 B1 | 11/2005 | Volftsun et al. |
| 6,990,124 B1 | 1/2006 | Dalias et al. |
| 7,161,925 B2 | 1/2007 | Wallenius et al. |
| 7,447,513 B2 | 11/2008 | Anttila et al. |
| 7,466,991 B2 | 12/2008 | Everson et al. |
| 7,496,111 B2 | 2/2009 | Itzkovitz et al. |
| 7,620,391 B2 | 11/2009 | Itzkovitz et al. |
| 2001/0017483 A1 | 8/2001 | Frohberg |
| 2002/0075881 A1 | 6/2002 | Yoakum et al. |
| 2003/0012183 A1 | 1/2003 | Butler et al. |
| 2003/0031160 A1 | 2/2003 | Gibson Ang et al. |
| 2003/0081754 A1 | 5/2003 | Esparza et al. |
| 2003/0093563 A1 | 5/2003 | Young et al. |
| 2003/0128694 A1 | 7/2003 | Hundscheidt et al. |
| 2004/0006623 A1 | 1/2004 | Gourddaud et al. |
| 2004/0176089 A1 | 9/2004 | Sylvain |
| 2004/0204095 A1 | 10/2004 | Cyr et al. |
| 2004/0219948 A1 | 11/2004 | Jones et al. |
| 2004/0246990 A1 | 12/2004 | Krishnamurthi et al. |
| 2005/0009520 A1 | 1/2005 | Herrero et al. |
| 2006/0104306 A1 | 5/2006 | Adamczyk et al. |
| 2006/0105766 A1 | 5/2006 | Adaza et al. |
| 2006/0229078 A1 | 10/2006 | Itzkovitz et al. |
| 2006/0276193 A1 | 12/2006 | Itzkovitz et al. |
| 2007/0002844 A1* | 1/2007 | Ali .................. 370/352 |
| 2007/0238467 A1 | 10/2007 | Buckley et al. |
| 2007/0263599 A1* | 11/2007 | Itzkovitz et al. ......... 370/352 |
| 2007/0280154 A1 | 12/2007 | Gupta et al. |
| 2008/0259887 A1 | 10/2008 | Naqvi |
| 2009/0080382 A1 | 3/2009 | Chen et al. |
| 2009/0154484 A1 | 6/2009 | Reesor et al. |
| 2009/0316693 A1 | 12/2009 | Itzkovitz et al. |
| 2010/0002606 A1 | 1/2010 | Preis et al. |
| 2010/0041428 A1 | 2/2010 | Chen et al. |

OTHER PUBLICATIONS

Kalmanek et al., "A Network-Based Architecture for Seamless Mobility Services", IEEE Communications Magazine, pp. 103-109, Jun. 2006.
U.S. Appl. No. 11/433,955 Official Action dated Dec. 6, 2010.
Lucent Technologies Inc., "IP Multimedia Subsystem (IMS) Service Architecture" White Paper, USA, Feb. 2005.
U.S. Appl. No. 12/788,330 "Providing session-based services to event-based networks using partial information" filed May 27, 2010.
U.S. Appl. No. 12/788,332 "Providing session-based service orchestration to event-based networks" filed May 27, 2010.
U.S. Appl. No. 12/551,588 Official Action dated Jun. 14, 2010.
Annex B of Standard EN 301 140-1 V1.3A, "Intelligent Network (IN): Intelligent Network Aplication Protocol (INAP); Capability Set 2 (CS2); Part 1: Protocol Sepcification", European Telecommunications Standards Institute (ETSI-Sophia Antipolis, France), Jun. 1999.
ETSI TS 123 228 V7.2.0, "Digital Cellular Telecommunications System (Phase 2+); Universal Mobile Telecommunications System (UMTS); IP Multimedia Subsystem (IMS); Stage 2 (3GPP TS 23.228 version 7.2.0 Release 7)", Technical Specification, Sophia Antipolis, France, Dec. 2005.
Faynberg et al., "The Development of the Wireless Intelligent Network (WIN) and its Relation to the International Intelligent Network Standards", Bell Labs Technical Journal, pp. 57-80, Summer 1997.
U.S. Appl. No. 11/362,273 Official Action Mar. 6, 2009.
Parlay Group Inc., "Parlay APIs 2.1: Generic Call Control Service Interfaces", Version 2.1, Jun. 26, 2000.
Perdikeas et al., "Parlay-based service engineering in a converged Internet-PSTN environment", Computer Networks 35, pp. 565-578, year 2001.
Rosenberg et al., "SIP: Session Initiation Protocol", Network Working Group, RFC 3261, Jun. 2002.
"Wireless Application Protocol. Wireless Telephony Application Specification", WAP WTA, pp. 36-37, Version 08—Nov. 1999.
Zhu et al., "IIN model: modifications and case study", Computer Networks 35, pp. 507-519, year 2001.
European Patent Application No. 01958333 Official Action dated Jan. 2, 2008.
European Patent Application No. 01958333 Search Report dated Sep. 3, 2007.
International Application PCT/IL2001/000723 Search Report dated Jun. 21, 2002.
International Application PCT/IL2006/000079 Patentability Report dated Aug. 6, 2009.
International Application PCT/IL2006/000079 Search Report dated Jul. 1, 2008.
U.S. Appl. No. 10/344,291 Official Action dated Feb. 8, 2007.
U.S. Appl. No. 10/344,291 Official Action dated Jun. 12, 2008.
U.S. Appl. No. 10/344,291 Official Action dated Oct. 4, 2007.
U.S. Appl. No. 11/361,690 Official Action dated Jan. 9, 2009.
U.S. Appl. No. 11/361,690 Official Action dated Jun. 19, 2008.
U.S. Appl. No. 11/361,839 Advisory Action dated Jun. 11, 2009.
U.S. Appl. No. 11/361,839 Official Action dated Jun. 19, 2008.
U.S. Appl. No. 11/361,839 Official Action dated Mar. 31, 2009.
U.S. Appl. No. 11/362,273 Official Action dated Jun. 19, 2008.
Chinese Search Report dated Jul. 24, 2013 for Chinese Patent Application No. 201080023354.8 filed May 27, 2010.

* cited by examiner

PROVIDING SESSION-BASED SERVICES TO EVENT-BASED NETWORKS IN MULTI-LEG CALLS

CROSS-REFERENCE TO RELATED APPLICATIONS

This application claims the benefit of U.S. Provisional Patent Application 61/181,302, filed May 27, 2009, which application is incorporated herein by reference. This application is related to a U.S. Patent Application entitled "Providing Session-Based Services to Event-Based Networks using Partial Information" and to U.S. Patent Application Ser. No. 12/788,332, filed on May 27, 2010, now U.S. Pat. No. 8,493,913, issued on July 23, 2013, entitled "PROVIDING SESSION-BASED SERVICE ORCHESTRATION TO EVENT-BASED NETWORKS", which applications are herein incorporated by reference.

FIELD OF THE INVENTION

The present invention relates generally to communication systems, and particularly to methods and systems for providing call services over communication networks.

BACKGROUND OF THE INVENTION

Several concepts and architectures are known in the art for providing communication services over communication networks. For example, the Intelligent Network (IN) is an architectural concept that enables real-time execution of network services and customer applications in a distributed environment of interconnected computers and switching systems, such as wire-line and wireless telephone networks. IN standards have been promulgated by the International Telecommunications Union (ITU-T) and by the American National Standards Institute (ANSI). The IN concept is described, for example, by Faynberg et al., in "The Development of the Wireless Intelligent Network (WIN) and Its Relation to the International Intelligent Network Standards," Bell Labs Technical Journal, Summer, 1997, pages 57-80, which is incorporated herein by reference.

Another example of a standardized service provisioning architecture is the Internet Protocol Multimedia Subsystem (IMS) architecture. The IMS architecture is defined and described in a $3^{rd}$ Generation Partnership Project (3GPP) standard entitled "Technical Specification Group Services and System Aspects; IP Multimedia Subsystem (IMS); Stage 2 (Release 7)," 3GPP TS 23.228, version 7.2.0, December 2005, which is incorporated herein by reference. The IP multimedia core network (IM CN) subsystem enables Public Land-Mobile Network (PLMN) operators to offer their subscribers multimedia services based on and built upon Internet applications, services and protocols. The IMS architecture is described, for example, in a whitepaper published by Lucent Technologies Inc. (Murray Hill, N.J.), entitled "IP Multimedia Subsystem (IMS) Service Architecture," February, 2005, which is incorporated herein by reference.

Signaling in IMS networks is typically performed in accordance with the Session Initiation Protocol (SIP). SIP is described by Rosenberg et al., in Request For Comments (RFC) 3261, published by the Internet Engineering Task Force (IETF), entitled "SIP: Session Initiation Protocol," June 2002, which is incorporated herein by reference.

Various techniques for providing services across multiple communication domains are known in the art. For example, PCT International Publication WO 2006/077587, whose disclosure is incorporated herein by reference, describes a method for communication in a communication system that includes a circuit-switched network and a packet-switched network. The method includes accepting a request to set up a call for a communication terminal associated with one of the circuit-switched network and the packet-switched network. The call is established with the one of the circuit-switched network and the packet-switched network responsively to the request. During the call, a first service platform in the circuit-switched network is invoked to provide a first call service, and a second service platform in the packet-switched network is invoked to provide a second call service to the communication terminal.

As another example, U.S. Patent Application Publication 2007/0263599, whose disclosure is incorporated herein by reference, describes a method for communication. The method includes predefining a plurality of service delivery modes having different signaling and media path configurations in circuit-switched and packet-switched networks. A request to place a call is accepted in the circuit-switched network, and a call service to be provided to the call by a service platform in the packet-switched network is identified responsively to the request. A service delivery mode is selected from the plurality responsively to an attribute of the call indicated by the request. Signaling and media paths are established for the call via the circuit-switched and packet-switched networks in accordance with the signaling and media path configurations of the selected service delivery mode. The call service is provided from the service platform to the call using the established signaling and media paths.

SUMMARY OF THE INVENTION

An embodiment of the present invention that is described hereinbelow provides a method for communication, including:

during a multi-leg call conducted in a circuit-switched network, which operates in accordance with a first communication protocol that manages calls among subscribers by exchanging discrete events among elements of the circuit-switched network, receiving from the circuit-switched network a sequence of the events related to the multi-leg call;

based on the sequence of the events, generating multiple emulated communication sessions in a packet-switched network that operates in accordance with a second communication protocol; and using the multiple emulated sessions, causing a service platform in the packet-switched network to provide a communication service to the multi-leg call conducted in the circuit-switched network.

In some embodiments, the first communication protocol includes an Intelligent Network (IN) protocol, and the second communication protocol includes a Session Initiation Protocol (SIP). In a disclosed embodiment, generating the multiple emulated communication sessions includes representing communication on each leg of the multi-leg call using one or more respective ones of the emulated communication sessions. In an embodiment, the method includes updating a first state machine representing the multi-leg call in the circuit-switched network responsively to the received events, and generating the multiple emulated communication sessions includes defining multiple second state machines that respectively represent the multiple emulated communication sessions in the packet-switched network, and synchronizing the first state machine and the second state machines with one another.

In another embodiment, causing the service platform to provide the communication service includes receiving one or more messages from the service platform, and sending one or more events to the circuit-switched network responsively to the messages received from the service platform. In yet another embodiment, the received sequence of the events includes an incomplete subset of the events related to the multi-leg call. In still another embodiment, the method includes providing multiple call services to the multi-leg call conducted in the circuit-switched network from the packet-switched network by cascading multiple service sessions, each providing a respective one of the call services, in the packet switched network responsively to the emulated communication sessions.

There is additionally provided, in accordance with an embodiment of the present invention, a mediation system, including:

a first interface for communicating with a circuit-switched network, which operates in accordance with a first communication protocol that manages calls by exchanging discrete events among elements of the circuit-switched network;

a second interface for communicating with a packet-switched network that operates in accordance with a second communication protocol; and a processor, which is configured to receive from the circuit-switched network, during a multi-leg call conducted in the circuit-switched network, a sequence of the events related to the multi-leg call, to generate multiple emulated communication sessions in the packet-switched network based on the sequence of the events, and, using the multiple emulated sessions, to cause a service platform in the packet-switched network to provide a communication service to the multi-leg call conducted in the circuit-switched network The present invention will be more fully understood from the following detailed description of the embodiments thereof, taken together with the drawings in which:

DETAILED DESCRIPTION OF EMBODIMENTS

Overview

Embodiments of the present invention that are described herein offer improved methods and systems for providing call services that are implemented in one communication network, to calls that are conducted in another network. In particular, these methods and systems mediate between calls that are conducted using event-based protocols and services that are implemented using session-based protocols. The term "event-based protocol" refers to communication protocols that manage calls among subscribers by generating and responding to discrete events. An event may comprise any discrete trigger or notification indicating that a certain event related to the call has occurred. In a session-based protocol, on the other hand, a call follows a predefined state model and progresses from one state to another in a rigid, well-defined set of possible transitions.

A typical example of an event-based protocol is the Intelligent Network (IN) protocol. A typical example of a session-based protocol is the Session Initiation Protocol (SIP). The embodiments described herein refer mainly to schemes that provide SIP-based services to IN calls, although the disclosed techniques can be used with various other protocols.

In some embodiments, a mediation system is connected to a circuit-switched network and to a packet-switched network. The packet-switched network comprises one or more service platforms, which provide call services to sessions using a session-based protocol (e.g., SIP). In the circuit-switched network, a call is conducted among two or more subscribers using an event-based protocol (e.g., IN). In particular, one or more call services are to be provided to the call. The mediation system accepts from the circuit-switched network a sequence of events related to the call, and uses these events to generate one or more emulated communication sessions of the session-based protocol in the packet-switched network. The emulated sessions cause the service platforms in the packet-switched network to provide the requested call services, as though a session-based call were actually being conducted in the packet-switched network. The mediation system translates the resulting session-based signaling to equivalent event-based signaling that is sent to the circuit-switched network. Using this scheme, the session-based service platforms provide the requested call services to the event-based call in the circuit-switched network.

In some of the disclosed techniques, the mediation system emulates the communication sessions in the packet-switched network even when the sequence of events received from the circuit-switched network is incomplete. In addition, the mediation system may discard parts of the session-based signaling that do not affect the event-based call. These features enable considerable reduction in the signaling overhead over the circuit-switched network.

In other disclosed techniques, the mediation system causes the session-based service platforms to provide call services to multi-leg calls. In an example embodiment, the mediation system generates multiple emulated sessions in the packet-switched network for a given multi-leg call, one emulated session representing each leg of the call. In other disclosed techniques, the mediation system coordinates ("orchestrates") multiple call services to be provided to a given call. In an example embodiment, the services are orchestrated by generating sessions representing the services and cascading the sessions.

The methods and systems described herein can be used, for example, to provide advanced SIP services to legacy IN networks. A wide variety of call services can be provided, such as Virtual Private Network (VPN), Click-to-dial and screening services (e.g., black lists and/or white lists), as well as charging and billing services. Some services, such as Ring-Back Tone, Personal Auto-Attendant and Conferencing, may involve media processing in addition to signaling.

System Description

Figure 1:
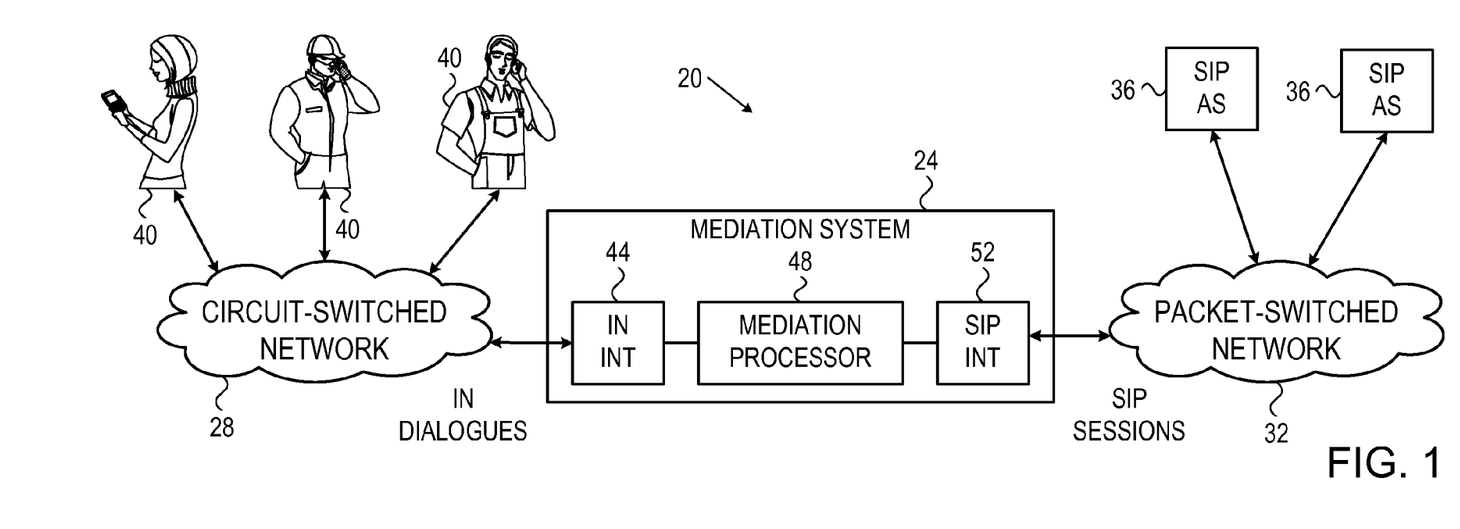
FIG. 1 is a block diagram that schematically illustrates a communication system, in accordance with an embodiment of the present invention.

FIG. 1 is a block diagram that schematically illustrates a communication system 20, in accordance with an embodiment of the present invention. System 20 comprises a mediation system 24, which is connected to a circuit-switched communication network 28 and to a packet-switched communication network 32. Mediation system 24 provides call services that are implemented in network 32 to users of network 28, using methods that are described in detail below.

Circuit-switched network 28 serves subscriber terminals 40, such as mobile terminals and Public Switched Telephone Network (PSTN) wire-line telephones. Subscriber terminals 40 may comprise cellular phones, cellular or wireless modems and adapters, and/or any other suitable terminal type. For the sake of simplicity, the description that follows will refer mainly to telephones, although the methods and systems described herein can be used in conjunction with any other type of terminals or communication clients. Terminals 40 may conduct various kinds of calls via network 28. Although the embodiments described herein refer mainly to voice calls, in the context of the present patent application and in the claims, the term "call" is used in a wider sense to describe any type of communication interaction among two or more terminals 40, such as, for example, voice calls, video calls or multimedia messaging service (MMS) messages.

Network 28 may comprise, for example, a Code Division Multiple Access (CDMA) cellular network such as a Cdma-One, Universal Mobile Telecommunication System (UMTS), CDMA2000 or EvDo network, a Global System for Mobile communication (GSM) cellular network, or any other suitable network. Network 28 provides Intelligent Network (IN) services to subscriber terminals 40, e.g., in accordance with the IN standards cited above. The terms "subscribers" and "subscriber terminals" are used interchangeably herein. The elements of network 28 are typically interconnected by a circuit-switched Public Land Mobile Network (PLMN) operating in accordance with the well-known Signaling System 7 (SS7) protocol. In some embodiments, network 28 comprises a wire-line, SS7-based network. In these embodiments, IN services are provided in network 28 in accordance with a variant of the IN standard, referred to as an Advanced Intelligent Network (AIN). Alternatively, any other IN-based protocol can also be used. Network 28 may comprise network elements (not shown) such as switches (e.g., Mobile Switching Centers—MSCs or Service Switching Points—SSPs), Home Location Register (HLR) or any other suitable network element.

Packet-switched network 32 may comprise, for example, an Internet Protocol (IP) network, a Wireless Local Area Network (WLAN), a Wi-Fi network, a WiMax Network, or any other packet-switched, wireless or wire-line, communication network. In some embodiments, network 32 may comprise a packet network operating over a mobile infrastructure, such as a CDMA2000 EvDO network. In the present example, network 32 comprises an IP Multimedia Subsystem (IMS) network, in accordance with the IMS standards cited above. As such, signaling in network 28 is performed in accordance with the Session Initiation Protocol (SIP), cited above. Network 32 typically provides connectivity and communication services to IP terminals (not shown). Network 32 may comprise network elements (not shown) such as a Call State Control Function (CSCF) or any other suitable network element.

Network 32 comprises one or more service platforms, in the present example SIP Application Servers (AS) 36, which provide call services that are implemented using SIP. (The terms "call service" and "communication service" are used interchangeably herein.) Mediation system 24 enables SIP AS 36 in packet-switched network 32 to provide SIP-based call services to calls that are conducted among subscribers 40 in circuit-switched network 28. Mediation system 24 comprises an IN interface 44 for communicating with network 28, a SIP interface 52 for communicating with network 32, and a mediation processor 48 that carries out the methods described herein.

Mediation system 24 is typically implemented in software running on a suitable computer. Typically, mediation processor 48 comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory. Alternatively, however, some of the functions of system 24 may be implemented using hardware, or using a combination of hardware and software elements.

Mediation Between Event-Based and Session-Based Protocols

IN signaling and SIP signaling are fundamentally different in nature. The IN protocols are inherently event-based protocols. According to the IN protocol, the different elements of the circuit-switched network carry out and manage calls by exchanging and responding to discrete events. In this context, the term "event" refers to a signal, trigger or notification indicating that a certain event has taken place. Some events indicate the progress of the call, whereas other events may relate to charging or other functions. The sequence of IN events (also referred to as IN triggers) that are exchanged during a given call is referred to as an IN dialogue. SIP, on the other hand, is a session-based protocol. In SIP, on the other hand, a call between two subscribers is represented by a session. SIP sessions have a concrete model, often represented by a state machine having states and state transitions. A given SIP session progresses from one state to another along the state transitions according to the model.

SIP sessions are typically point-to-point, i.e., defined between two endpoints (e.g., between two subscribers or between a subscriber and a SIP AS). IN calls, on the other hand, may involve multiple endpoints, e.g., in a multi-party call.

The example embodiments described herein refer mainly to a mediation system that provides SIP services to IN calls. These embodiments, however, are described purely by way of example. The methods and systems described herein can be used to provide call services that are implemented using any suitable session-based protocol, to calls that are conducted using any suitable event-based protocol. Another example of an event-based protocol is Diameter Credit Control Application (DCCA). The techniques described herein can be used, for example, to represent DCCA-based charging services using a session-based protocol.

Figure 2:
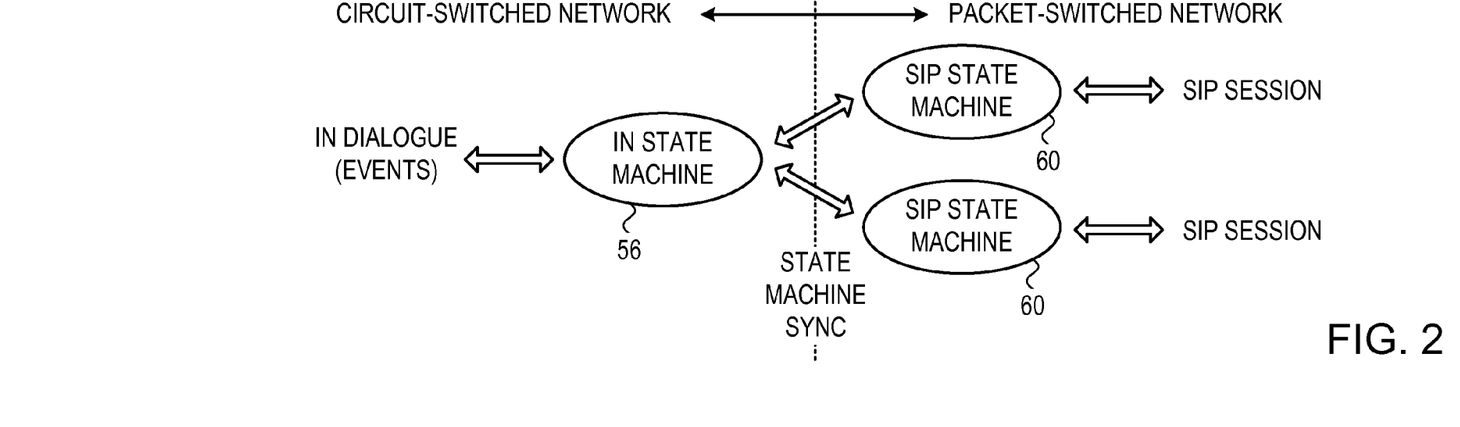
FIG. 2 is a diagram that schematically illustrates a process of providing a Session Initiation Protocol (SIP) call service to a call conducted using an Intelligent Network (IN) protocol, in accordance with an embodiment of the present invention.

FIG. 2 is a diagram that schematically illustrates a process of providing a SIP call service to a call conducted using an IN protocol, in accordance with an embodiment of the present invention. The diagram of FIG. 2 shows some of the functions performed by mediation processor 48 in system 24.

Processor 48 maintains a respective IN state machine 56 for each IN call. The IN state machine has a certain set of call states, and a certain set of transitions between the call states. As the IN call progresses, processor 48 receives IN events that are generated during the call from network 28. Based on the received events, processor 48 updates the current state of state machine 56. Although FIG. 2 shows a single IN state machine 56 for the sake of clarity, processor 48 typically holds multiple IN state machine instances, corresponding to the multiple IN calls that are in progress. Note that a given IN call may involve more than two subscribers 40, e.g., in a multi-party call. Typically, the composite state of the entire multi-party call is represented by a single IN state machine 56. (The handling of multi-party calls is described in greater detail further below.)

In order to provide call services from SIP AS 36 in network 32 to a given IN call in network 28, processor 48 generates one or more emulated SIP sessions, which emulate the IN call in packet-switched network 32. Each SIP session is represented by a respective SIP state machine 60. Processor 48 may sometimes emulate a single IN call using multiple SIP sessions. For example, in a point-to-point IN call, one SIP session may be defined between one of the subscribers to the SIP AS, and another SIP session may be defined between the SIP AS and the other subscriber. In a multi-party IN call, multiple SIP sessions may be defined. Each SIP session may represent communication between a given pair of subscribers, or between a given subscriber and a SIP AS. In other words, a given IN state machine 56 may correspond to one or more SIP state machines 60.

Generally, SIP state machines 60 are different in structure from IN states machines 56, since they correspond to different communication protocols. When generating the emulated sessions, processor 48 synchronizes the SIP state machines and the IN state machine of the call, so that all state machines represent the current state of the call in the IN domain and in the SIP domain.

State machine synchronization is typically bidirectional. When processor 48 performs a state transition in the IN state machine in response to newly-arriving IN events, the processor updates the corresponding SIP state machines to reflect this state transition. In the opposite direction, when processor 48 performs a state transition in a SIP state machine in response to the interaction with a SIP AS, the processor updates the corresponding IN state machines to reflect this state transition.

In response to a state transition in IN state machine 56, processor 48 may generate one or more IN events that reflect this change to network 28 (and in particular to subscribers 40). In response to a state transition in SIP state machine 60, processor 48 may generate SIP signaling reflecting this change to network (and in particular to SIP AS 36). In an example embodiment, processor 48 may hold a mapping between IN events and SIP messages, and use this mapping for emulating the SIP session and for generating IN events. For example, the following table lists several examples of incoming IN events from network 28 and the corresponding SIP messages generated by processor 48 toward network 32:

| Received IN Event | Generated SIP message |
|---|---|
| InitialDP | INVITE |
| (oAnswer)EventReportBCSM | OK |
| (tAnswer)EventReportBCSM | OK |
| (Seized_Term_O)EventReportBCSM | (Ringing) 180 |
| (CallAttempt)EventReportBCSM | (Ringing) 180 |
| (Failure_Select_Route)EventReportBCSM | (Gone) 410 |
| (obusy)EventReportBCSM | (BUSY HERE) 486 |
| (tbusy)EventReportBCSM | (HERE BUSY) 486 |
| (oNoAnswer)EventReportBCSM | 408 (Request Timeout) |
| (tNoAnswer)EventReportBCSM | 408 (Request Timeout) |
| (oAbandon)EventReportBCSM | CANCEL (originating session) |
| (tAbandon)EventReportBCSM | CANCEL (originating session) |
| (1leg, oDisconnect)EventReportBCSM | BYE (on originating SIP session) |
| (2leg, oDisconnect)EventReportBCSM | BYE (on terminating SIP session) |
| (1leg, tDisconnect)EventReportBCSM | BYE (on originating SIP session) |
| (2leg, tDisconnect)EventReportBCSM | BYE (on terminating SIP session) |

As another example, the following table lists several examples of incoming SIP messages from network 32 and the corresponding IN events generated by processor 48 toward network 28:

| Received SIP Message | Generated IN event |
|---|---|
| INVITE (on existing session) | Continue/Connect (depending on parameter change) |
| OK (on terminating SIP session) | Continue/Connect (depending on parameter change) |
| 486 (on terminating SIP session) | Continue/Connect/Release (depending on session state) |
| BYE (on originating SIP session) | ReleaseCall/Continue/ContinueWithArgument/DisconnectLeg(depending on session state) |
| BYE (on terminating SIP session) | ReleaseCall/Continue/ContinueWithArgument/DisconnectLeg(depending on session state) |

Toward network 28, processor 48 translates the interaction with SIP AS 36 into a valid IN dialogue. Thus, subscribers 40 (and other elements of network 28) exchange valid IN events, and are typically unaware that the call services they are provided with originate from another network and another protocol. Toward network 32, processor 48 translates the sequences of IN events (IN dialogues) into emulated SIP sessions. As a result, SIP AS 36 operate as if they interact with SIP terminals, and are typically unaware that they provide services to another network.

The above-described mechanisms can be used to provide any suitable type of call service (also referred to as communication service) from network 32 to subscribers 40, such as Click-to-Dial, Ring Back Tone, VPN and PrePaid.

Processor 48 may communicate with network 28 (via interface 44) using any suitable protocol, such as Intelligent Network Application Part (INAP), CAMEL Application Part (CAP), Wireless Intelligent Network (WIN) or Advanced Intelligent Network (AIN), or various Transaction Capabilities Application Part (TCAP) based protocols. Processor 48 typically communicates with network 32 (via interface 52) using SIP.

Mediation Between SIP and in Using Incomplete and/or Superfluous Information

In some embodiments, processor 48 generates the emulated SIP session or sessions based on an incomplete (partial) subset of the IN events exchanged during the IN call. In other words, processor 48 is able to synchronize IN state machine 56 and SIP state machines 60 based on only part of the IN events of the call. In the present context, the events received at processor 48 may be partial or incomplete for a number of reasons. For example, the term "incomplete" or "partial" may mean that mediation system 24 does not receive all events that are mandated by the standardized call model that is used in the circuit-switched network, e.g., because some events are not generated, or if generated are not transmitted to the mediation system. For example, in some circuit-switched networks, a network element may request to be notified of only a partial subset of the IN events. In such network configurations, mediation system 24 may request the network elements of network 28 to provide only a certain partial subset of the IN events.

As another example, the mediation system may receive all the events that are mandated by the circuit-switched network. The call model that is used in the packet-switched network, however, may require or expect additional events that are not mandated or generated in the circuit-switched network. In this scenario, the received events are also considered incomplete.

In some embodiments, processor 48 synchronizes the IN and SIP state machines and generates the emulated SIP sessions based on the incomplete subset of events. The ability to generate the emulated sessions based on only part of the IN events helps to reduce the signaling overhead in network 28. Using this technique, the bandwidth resources of network 28 can be used efficiently. This benefit is particularly important in large networks that carry large numbers of calls simultaneously.

System 24 may receive any suitable subset of IN events, as applicable, and processor 48 may use any suitable method for synchronizing state machines 56 and based on the incomplete subset of IN events. Two example scenarios are demonstrated in FIGS. 4A and 4B below.

Figure 3:
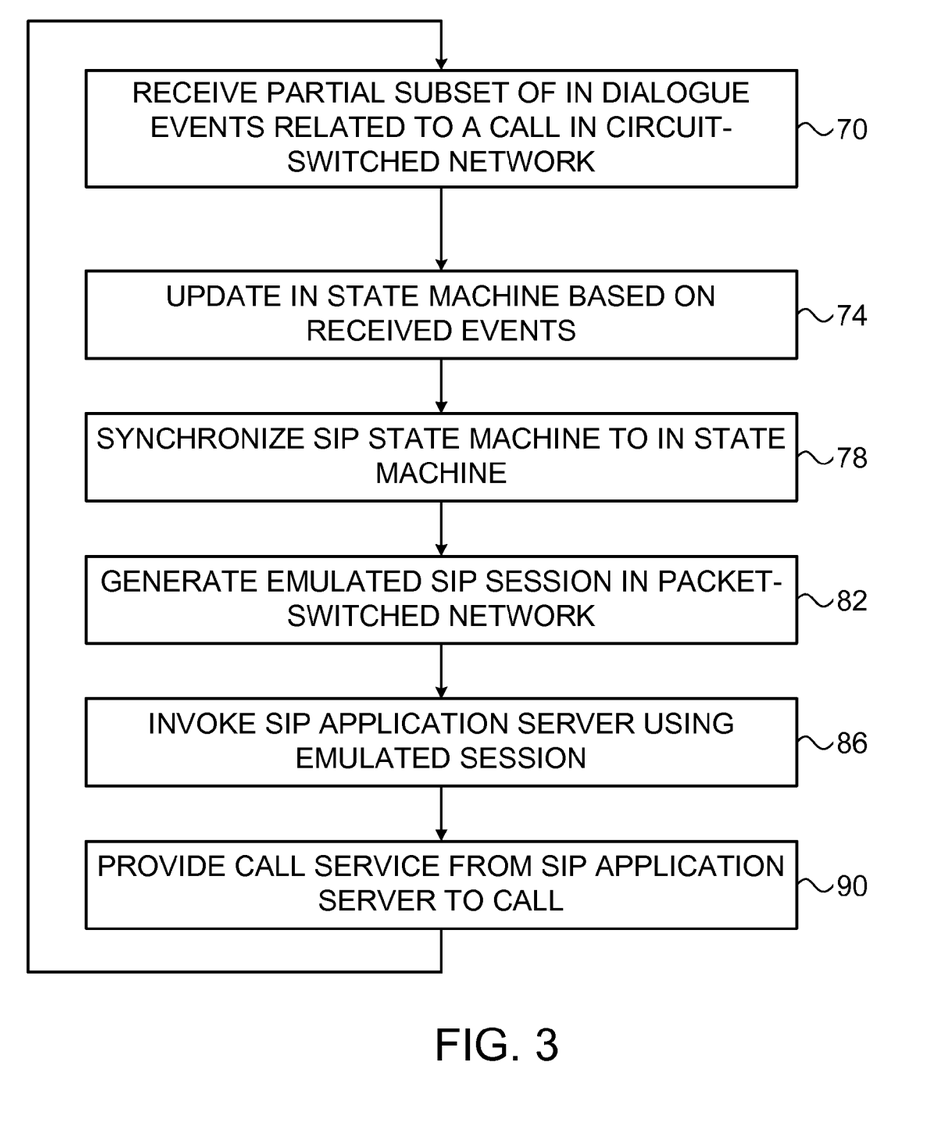
FIG. 3 is a flow chart that schematically illustrates a method for providing a SIP call service to a call conducted using an IN protocol, in accordance with an embodiment of the present invention.

FIG. 3 is a flow chart that schematically illustrates a method for providing a SIP call service to a call conducted using an IN protocol, in accordance with an embodiment of the present invention. The method begins with mediation processor 48 receiving via interface 44 a partial subset of the IN events pertaining to a given IN call, at a partial input step 70. Processor 48 updates IN state machine 56 based on the partial subset of events, at an IN state machine updating step 74. Processor 48 synchronizes SIP state machine (or machines) 60 to IN state machine 56, at a synchronization step 78. Based on the updated SIP state machine or machines, processor 48 generates one or more emulated SIP sessions in network 32, at a session generation step 82. Processor 48 thus generates SIP signaling, which reflects the emulated sessions, via interface 52.

The SIP signaling generated by processor 48 invokes SIP AS 36 to provide the desired SIP-based call service to the emulated session, at a service invocation step 86. Processor 48 translates the SIP signaling of the call service into an IN dialogue in network 28, at a service provisioning step 90. As a result, the SIP call service is provided from SIP AS 36 in network 32 to subscribers 40 in network 28.

In practice, some of the SIP signaling exchanged during the emulated sessions may not necessarily affect subscribers 40 or the IN dialogue in network 28. Thus, in some embodiments, processor 48 filters out some of the SIP signaling in network 32, and does not translate it into IN events in network 28. This technique helps to reduce the signaling overhead in network 28, as well. An example of such a scenario is shown in FIG. 4B below.

Figure 4A:
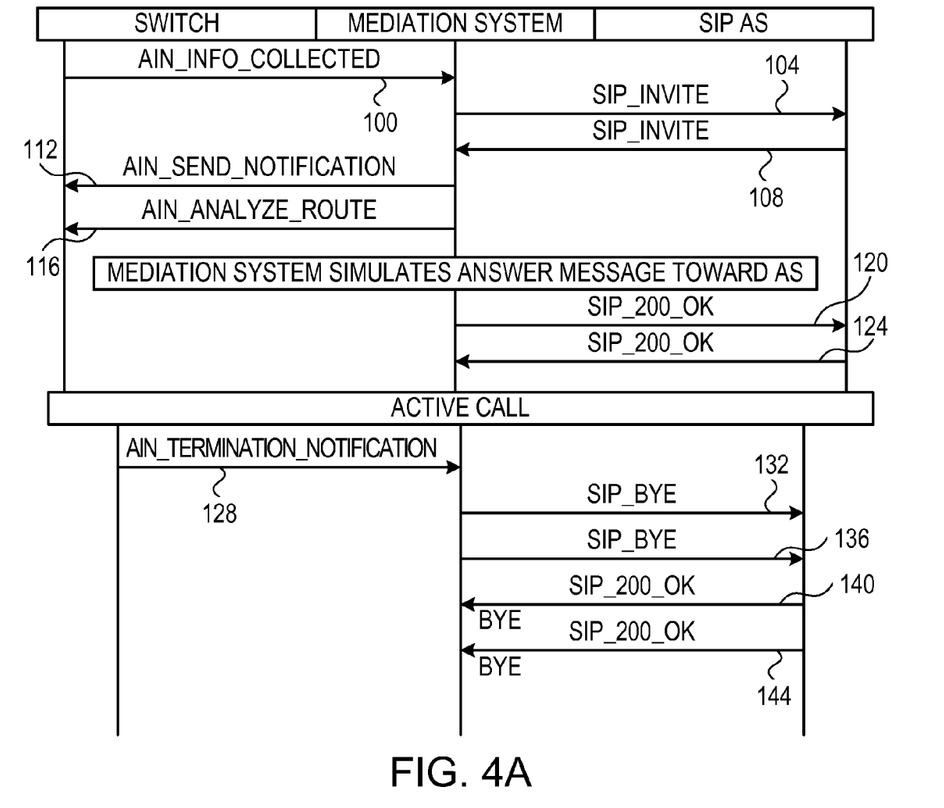
FIGS. 4A and 4B are call-flow diagrams that schematically illustrate processes of providing a SIP call service to a call conducted using an IN protocol, in accordance with embodiments of the present invention.
Figure 4B:
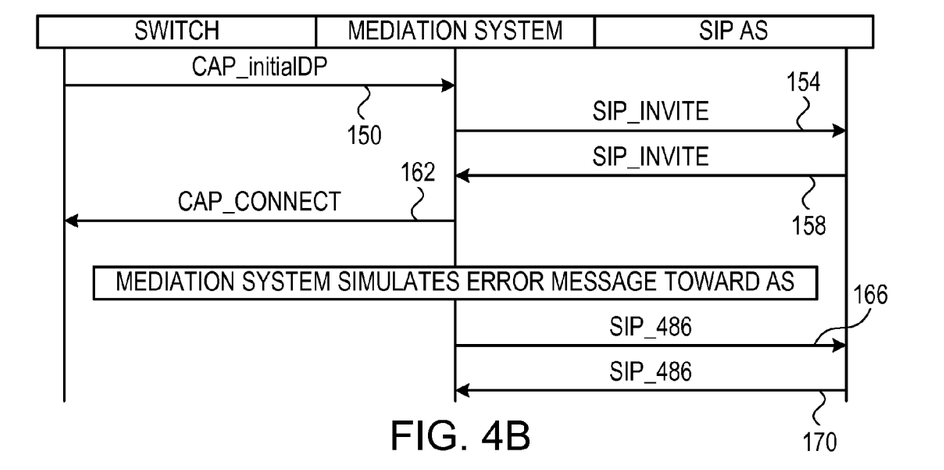

FIG. 4A is a call-flow diagram that schematically illustrates a process of providing a SIP call service to an IN call, in accordance with an embodiment of the present invention. The example of FIG. 4A describes the interaction among a switch (e.g., MSC or SSP) in circuit-switched network 28, mediation system 24 and SIP AS 36. In the present example, network 28 comprises a wire-line network that operates in accordance with the AIN protocol, and network 32 operates using SIP.

When a call is set-up in network 28, the switch sends an AIN_Info-Collected event 100 to mediation system 24. In response to this event, the mediation system generates a SIP_INVITE message 104 toward the SIP AS. The SIP AS responds with a SIP_INVITE message 108 in the opposite direction, toward the mediation system. In response to messages 104 and 108, two emulated SIP sessions are established—one from the mediation system to the SIP AS, and the other from the SIP AS to the mediation system. Having set-up the two SIP sessions, the mediation system sends an AIN_Send_Notification event 112 and an AIN_Analyze_Route event 116 to the switch.

At this point, the mediation system simulates an answer notification (i.e., a notification indicating that the call was answered by the called subscriber) in the packet-switched network, even though no such event was received from the circuit-switched network. In the present example, the AIN protocol does not specify an answer event that is sent between switches. In SIP, on the other hand, the SIP AS expects an answer notification of this sort. In order to comply with the SIP specifications, the mediation system automatically generates a SIP_200_OK message 120, which indicates to the SIP AS that the called party answered the call. Note that message 120 is generated automatically, and not in response to any corresponding event arriving from network 28.

The SIP AS responds with a SIP_200_OK message 124. From this point, the call is active, and the SIP AS provides the requested service. When the call is terminated in the circuit-switched network, the switch sends an AIN_Termination_Notification event 128 to the mediation system. In response to this event, the mediation system sends two SIP BYE messages 132 and 136 to the SIP AS, so as to terminate the two SIP sessions defined between the mediation system and the AS (the sessions set up using SIP_INVITE messages 104 and 108). The SIP AS responds with two respective SIP_200_OK messages 140 and 144.

In the example of FIG. 4A, the AIN events received from the circuit-switched network are incomplete in the sense that they do not contain all the event types that are expected by the communication protocol (SIP) used in packet-switched network.

FIG. 4B is a call-flow diagram that schematically illustrates a process of providing a SIP call service to an IN call, in accordance with another embodiment of the present invention. In the example of FIG. 4B, circuit-switched network 28 operates using CAP, and packet-switched network 32 operates using SIP.

When a call is set-up in network 28, the switch sends a CAP_InitialDP event 150 to mediation system 24. In response to this event, the mediation system generates a SIP_INVITE message 154 toward the SIP AS. The SIP AS responds with a SIP_INVITE message 158 toward the mediation system. In response to messages 154 and 158, two emulated SIP sessions are established—one from the mediation system to the SIP AS, and the other in the opposite direction. Having set-up the two SIP sessions, the mediation system sends a CAP_CONNECT event 162 to the switch. The CAP_CONNECT operation will, in this case, close the dialog between network 28 and mediation system 24. No further event related to this call will be reported to the mediation system.

At this point, it is desired to discontinue the service provided by the SIP AS. As such, it is also desirable that the mediation system stops receiving events from network 28 regarding this call. In order to discontinue the SIP service, the mediation system automatically generates an artificial busy message 166 (in the present example a SIP_486 message) toward the SIP AS. This busy message is not caused by any genuine error in the call or by any other event arriving from network 28. As a result of the artificial busy message, the SIP AS responds with a SIP 486 message 170, and the SIP sessions corresponding to the call are terminated. Consequently, no subsequent events related to this call arrive at the mediation system, and network bandwidth is conserved. This example demonstrates how processor 48 filters out some of the SIP signaling in network 32, and refrains from translating it into IN events in network 28. In the present example, the SIP 486 messages are generated for completeness of the SIP session, and are not followed by any IN signaling in network 28.

The scenarios shown in FIGS. 4A and 4B are chosen purely by way of example, to demonstrate the ability of the mediation system to provide SIP services to IN calls in the presence of incomplete event sequences. The methods and systems described herein can be used in various other scenarios.

Providing SIP Services to Multi-Leg in Calls

Some IN calls in network 28 involve more than two legs, and are referred to as multi-leg calls. Some multi-leg calls involve more than two subscribers 40. Calls of this sort are referred to as multi-party calls. Other multi-leg calls may involve only two subscribers. In a conference call, for example, the call has a leg that connects each subscriber to a conference bridge. The call model of a multi-leg call is complex, since state transitions that are related to one leg or one subscriber may affect the call progress in other legs or other subscribers. A "leg" of a call denotes a point-to-point connection between two entities involved in the call, e.g., between two subscribers, between a subscriber and a network element, or between two network elements. Thus, the IN state machine that represents a multi-leg call is often large and complex. In SIP, on the other hand, a given SIP session is typically defined as point-to-point, i.e., as an interaction between two endpoints.

In some embodiments, mediation system 24 provides SIP-based call services from network 32 to multi-leg IN calls held in network 28. In order to mediate between subscribers 40 and SIP AS 36 in this scenario, mediation processor 48 typically defines a single IN state machine that tracks a given multi-leg IN call. In the SIP domain, processor 48 defines multiple SIP state machines 60 for the multi-leg call, one for each leg of the call. In other words, processor 36 emulates a multi-leg IN call in the SIP domain by generating three or more emulated SIP sessions, one emulated session for each leg of the call.

Processor 48 receives the IN dialogue (i.e., sequence of IN events) related to the multi-leg call from network 28. The received IN events may comprise the entire IN dialogue (i.e., all IN events related to the call) or a certain incomplete subset of the events, as explained above. Processor 48 updates the state of IN state machine 56 based on the received IN events.

As the multi-leg call progresses, processor 48 synchronizes the IN state machine and the SIP state machines, so that the multiple SIP sessions emulate the multi-leg IN call toward SIP AS 36. One or more SIP AS 36 provide SIP-based call services to the emulated SIP sessions, as if they interact with genuine SIP terminals. Processor 48 translates the resulting SIP signaling to equivalent IN events in network 28. Thus, subscribers 40 that participate in the multi-leg call are provided with the requested services.

Figure 5:
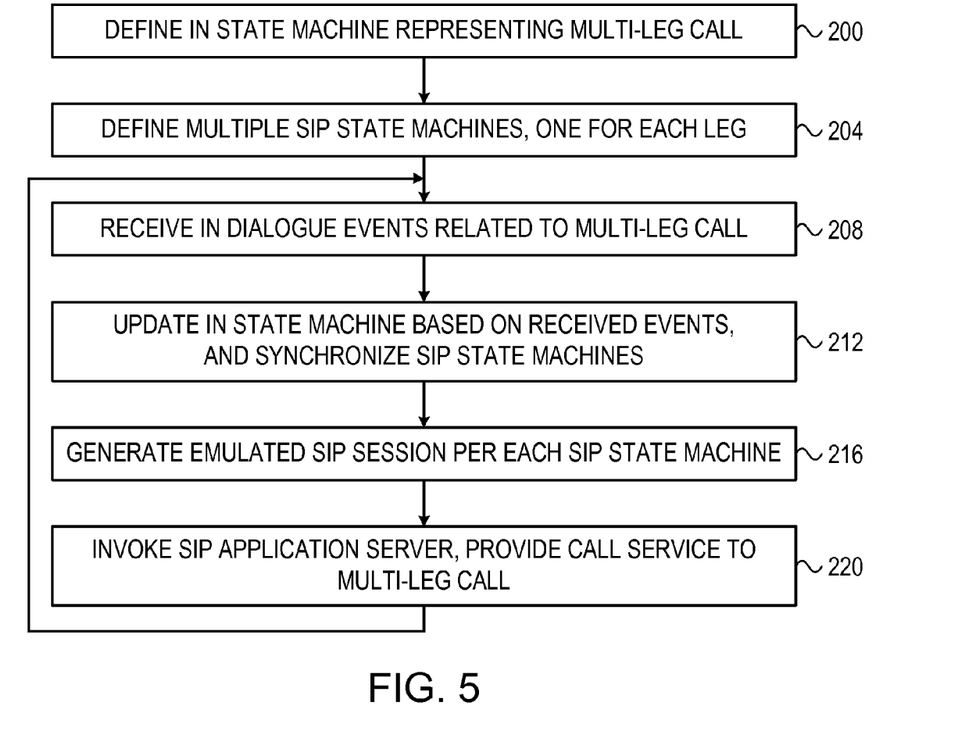
FIG. 5 is a flow chart that schematically illustrates a method for providing a SIP call service to a multi-leg call conducted using an IN protocol, in accordance with an embodiment of the present invention.

FIG. 5 is a flow chart that schematically illustrates a method for providing a SIP call service to a multi-leg IN call, in accordance with an embodiment of the present invention. The method begins with mediation processor 48 defining a single IN state machine 56 representing the entire multi-leg IN call, at an IN state machine definition step 200. Processor 48 defines multiple SIP state machines 60, such that each state machine 60 represents a respective leg of the multi-leg call, at a SIP state machine definition step 204.

Processor 48 receives via interface 44 a sequence of IN events related to a given multi-leg IN call, at an event input step 208. Processor 48 updates IN state machine 56 based on the sequence of IN events, and synchronizes the multiple SIP state machines 60 to IN state machine 56, at an updating and synchronization step 212. Based on the updated SIP state machines, processor generates multiple emulated SIP sessions in network 32, at a SIP generation step 216. Each emulated SIP session represents a respective leg of the multi-leg call. The SIP signaling of the emulated sessions invokes SIP AS 36 to provide the requested SIP-based call services to the multi-leg call, at an invocation step 220.

Call Service Orchestration in the SIP Domain

In some scenarios, multiple call services are provided to the same IN call. For example, a screening service can be combined with a home-zoning and/or prepaid service. Unless accounted for, providing multiple services to a call may cause conflicts, since each service potentially affects the call progress. Coordinating the provisioning of services to a given call is sometimes referred to as service orchestration. In some embodiments, mediation system 24 orchestrates multiple call services in the SIP domain by defining a separate SIP session for each service, and cascading the SIP sessions.

Figure 6:
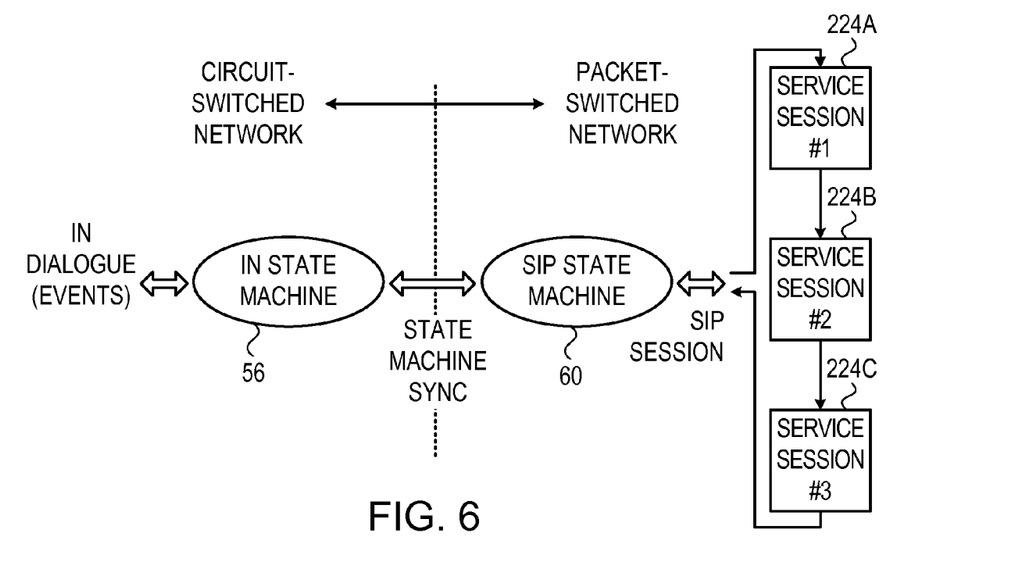
FIG. 6 is a diagram that schematically illustrates a process of providing multiple SIP call services to a call conducted using an IN protocol, in accordance with an embodiment of the present invention.

FIG. 6 is a diagram that schematically illustrates a process of orchestrating SIP call services provided to an IN call, in accordance with an embodiment of the present invention. In the present example, mediation processor 48 generates an emulated SIP session that represents the IN call (as explained above), and three service sessions 224A-224C. Processor 48 cascades the SIP sessions. (Each SIP session is defined between two endpoints. Cascading sessions means connecting the endpoints, using the sessions, in series.)

Consider, for example, an example in which a certain IN call requests three SIP services. The three services are provided by three respective SIP AS. In order to provide the services in a coordinated manner, mediation processor 48 generates SIP service sessions that emulate the three services, and cascades the service sessions. For the case of three SIP AS, processor 48 may generate up to six sessions.

Each pair of sessions corresponds to a given AS, and represents the interaction of two SIP endpoints with this AS. For a given pair of sessions, both SIP endpoints are actually processor 48, which represents the calls toward the IN side (network 28). The first endpoint in the pair sends a SIP session to the AS. In some embodiments, the AS routes the session to the second endpoint of the pair (actually back to processor 48). In this case, the AS typically operates in a proxy or redirect mode. In alternative embodiments, the AS establishes a new SIP session toward the second endpoint of the pair (processor 48). In this case, the AS typically operates in back-to-back UA mode.

The three pairs of service sessions are cascaded to one another via processor 48. For example, based on the second session of the pair corresponding to the first AS, processor 48 creates a new session toward the second AS, and so on. In total, the three SIP services are orchestrated by cascading six SIP sessions through processor 48:

| SIP session | Endpoints |
|---|---|
| #1 | Processor 48→AS#1 |
| #2 | AS#1→Processor 48 |
| #3 | Processor 48→AS#2 |
| #4 | AS#2→Processor 48 |
| #5 | Processor 48→AS#3 |
| #6 | AS#3→Processor 48 |

The cascaded service sessions can be viewed as a single composite SIP session, which provides the three call services #1-#3 in a coordinated manner. Orchestrating services by cascading SIP sessions is typically service-independent, i.e., independent of the specific structure or functionality of the orchestrated services. This sort of service orchestration is also independent of the structure of the call, i.e., independent of the structure of IN state machine 56 and SIP state machine 60.

Additional Embodiments and Variations

The methods and systems described herein can be used to provide a wide variety of SIP-based call services to IN calls. Although the embodiments described herein refer mainly to call services that are related to call progress, the disclosed methods and systems are in no way limited to such services. For example, the techniques described herein can be used to provide SIP-based charging and/or billing services to IN calls. In an example embodiment, a SIP-based charging or billing service is implemented on a SIP AS. The schemes of FIGS. 1-6 above can be used to provide this charging or billing service to IN calls conducted in network 28.

For example, a SIP-based prepaid charging service may allocate a certain prepaid credit to a subscriber. During a call, the service accepts requests for credit quotas, and approves or declines the requests based on the current remaining credit. This sort of charging service can be provided to IN calls in network 28 using the disclosed techniques. In this example, the quota requests are provided to mediation processor 48 as IN events, and the mediation processor translates them into an emulated SIP session that interacts with the SIP AS that implements the charging service. In the opposite direction, processor 48 translates quota approval and refusal into IN events that are sent to network 28.

In some embodiments, SIP-based charging or billing services can be provided using only an incomplete subset of the IN events (e.g., using the technique of FIG. 3 above). Additionally or alternatively, SIP-based charging or billing services can be provided to multi-part calls (e.g., using the technique of FIG. 5 above). As yet another example, SIP-based charging or billing services can be orchestrated with one another, and/or with other types of SIP-based services, using session cascading (e.g., using the scheme of FIG. 6 above).

The embodiments described herein refer mainly to the signaling that is exchanged during calls. The examples given herein focus mainly on the IN and SIP signaling that is involved in providing call services. The methods and systems described herein, however, can also be used for providing call services that involve processing of media in addition to signaling, such as Ring Back Tone and Personal Auto-Attendant services.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for providing session-based services to an event-based call over communication networks, the method comprising:

generating, in a circuit-switched network, a state machine that represents a multi-leg call, each leg of which denotes a point-to-point connection between two entities in the multi-leg call, wherein the state machine has call states and a set of transitions between the call states, and the circuit-switched network operates in accordance with a first communication protocol that manages calls by exchanging discrete events among elements of the network;

updating the state machine in response to a sequence of events related to the multi-leg call;

generating, in a packet-switched network, multiple state machines, which are synchronized to the state machine in the circuit-switch network, wherein the packet-switched network operates in accordance with a second communication protocol;

generating multiple emulated sessions, each of which represents a leg of the multi-leg call, and is represented by one of the state machines in the packet-switch network; and calling a service platform in the packet-switched network to provide a communication service to an emulated session, in response to a state transition in one of the multiple state machines in the packet-switched network.

2. The method according to claim 1, wherein the first communication protocol comprises an Intelligent Network (IN) protocol, and wherein the second communication protocol comprises a Session Initiation Protocol (SIP).

3. The method according to claim 1, wherein causing the service platform to provide the communication service comprises receiving one or more messages from the service platform, and sending one or more events to the circuit-switched network responsively to the messages received from the service platform.

4. The method according to claim 1, wherein the received sequence of the events comprises an incomplete subset of the events related to the multi-leg call.

5. The method according to claim 1, and comprising providing multiple call services to the multi-leg call conducted in the circuit-switched network from the packet-switched network by cascading multiple service sessions, each providing a respective one of the call services, in the packet switched network responsively to the emulated communication sessions.

6. A mediation system, comprising:

a first interface for communicating with a circuit-switched network, which operates in accordance with a first communication protocol that manages calls by exchanging discrete events among elements of the circuit-switched network;

a second interface for communicating with a packet-switched network that operates in accordance with a second communication protocol; and a processor, which is configured to generate in the circuit-switched network a state machine that represents a multi-leg call, each leg of which denotes a point-to-point connection between two entities in the multi-leg call, update the state machine in response to a sequence of events related to the multi-leg call, generate multiple state machines in the packet-switched network, which are synchronized to the state machine in the circuit-switched network, generate multiple emulated sessions in the packet-switched network, each of which represents a leg of multi-leg call, and is represented by one of the state machines in the packet-switch network, and call a service platform in the packet-switched network to provide a communication service to an emulated session, in response to a state transition in one of the state machines in the packet-switched network.

7. The system according to claim 6, wherein the first communication protocol comprises an Intelligent Network (IN) protocol, and wherein the second communication protocol comprises a Session Initiation Protocol (SIP).

8. The system according to claim 6, wherein the processor is configured to represent communication on each leg of the multi-leg call using one or more respective ones of the emulated communication sessions.

9. The system according to claim 6, wherein the processor is configured to receive one or more messages from the service platform, and to send one or more events to the circuit-switched network responsively to the messages received from the service platform.

10. The system according to claim 6, wherein the received sequence of the events comprises an incomplete subset of the events related to the multi-leg call.

11. The system according to claim 6, wherein the processor is configured to provide multiple call services to the multi-leg call conducted in the circuit-switched network from the packet-switched network by cascading multiple service sessions, each providing a respective one of the call services, in the packet switched network responsively to the emulated communication sessions.

\* \* \* \* \*